United States Patent
Puri et al.

Patent Number: 6,159,000
Date of Patent: Dec. 12, 2000

[54] VALVE GATED INJECTION MOLDING DEVICE

[75] Inventors: Rajan Puri, Mississauga, Canada; Peter C. Wolff, Georgia; Stefan Von Buren, Colchester, both of Vt.

[73] Assignee: Husky Injection Molding Systems Ltd., Canada

[21] Appl. No.: 09/268,083

[22] Filed: Mar. 12, 1999

[51] Int. Cl.⁷ .................................................. B29C 45/23
[52] U.S. Cl. .................... 425/562; 264/328.9; 425/564
[58] Field of Search .................................... 425/562, 563, 425/564, 565, 566; 264/328.9

[56] References Cited

U.S. PATENT DOCUMENTS

| | | |
|---|---|---|
| 3,677,682 | 7/1972 | Putkowski . |
| 3,716,318 | 2/1973 | Erik et al. . |
| 4,026,518 | 5/1977 | Gellert . |
| 4,095,931 | 6/1978 | Reitan . |
| 4,268,240 | 5/1981 | Rees et al. . |
| 4,330,258 | 5/1982 | Gellert . |
| 4,412,807 | 11/1983 | York . |
| 4,705,473 | 11/1987 | Schmidt . |
| 4,712,995 | 12/1987 | Basnett . |
| 4,810,184 | 3/1989 | Gellert et al. . |
| 4,925,384 | 5/1990 | Manner . |
| 5,002,480 | 3/1991 | Gellert et al. ............... 425/564 |
| 5,192,556 | 3/1993 | Schmidt . |
| 5,254,305 | 10/1993 | Fernandez et al. . |
| 5,533,882 | 7/1996 | Gessner et al. . |

FOREIGN PATENT DOCUMENTS 0405007  1/1991  European Pat. Off. .

*Primary Examiner*—Tim Heitbrink
*Attorney, Agent, or Firm*—Bachman & LaPointe, P.C.

[57] ABSTRACT

A hot runner valve gated injection molding device which directs melt from a melt channel to a melt cavity, including a guide sleeve positioned at the gate end of the nozzle body and surrounding the valve stem to guide the valve stem inside the guide sleeve and to provide a sealing device at the gate end of the nozzle body.

20 Claims, 5 Drawing Sheets

VALVE GATED INJECTION MOLDING DEVICE

BACKGROUND OF THE INVENTION

A hot runner valve gate stem is usually guided in a bushing as it passes through the hot runner manifold or the nozzle housing. However, plastic leakage at this point represents a serious problem. In some cases drool channels are provided to allow the plastic leakage to escape.

U.S. Pat. No. 4,268,240 to Rees et al. shows a valve gate with a valve stem or rod and represents an early example of a valve gate where the valve stem is guided at the tip end. U.S. Pat. No. 3,677,682 to Putkowski shows a front mounted valve gate wherein the valve stem is operated by an external cylindrical piston surrounding the heated nozzle housing. U.S. Pat. No. 5,533,882 to Gessner et al. shows a hot runner valve gated system wherein a nozzle housing is positioned in a manifold plate and including a gate orifice and a reciprocal valve stem. U.S. Pat. No. 4,095,931 to Reitan shows a valve stem housed inside a torpedo containing a heater. The valve stem is guided and presumably seals at the tip, but heating the valve stem adjacent this so-called seal would be likely to promote leakage.

Prior art examples of guiding valve stems inside the nozzle housing are shown in the following U.S. Pat. Nos.: 4,412,807 to York; 4,712,995 to Basnett; 4,810,184 to Gellert et al.; 3,716,318 to Erik et al.; 4,925,384 to Manner; and 5,254,305 to Fernandez et al. However, these patents have no teaching for preventing leakage around the valve stem as it passes through the manifold or nozzle-bushing interface, which is a significant problem.

U.S. Pat. No. 4,430,258 to Gellert shows a bushing set in the nozzle casting for preventing leakage at the valve stem. U.S. Pat. No. 4,026,518 to Gellert shows a valve stem unit with a built in drainage channel to remove leakage around the valve stem at the bushing.

European Patent Application 0,405,007 to Gellert, published Jan. 2, 1991, shows a hot runner valve gate bushing having a single entry port that directs the melt flow to two opposing exit ports opening into the vale stem. The idea is to help avert the problem of the melt recombining lower down the valve stem which may cause flow lines in the final molded article. Similarly, U.S. Pat. Nos. 5,192,556 to Schmidt and 4,705,473 to Schmidt attempt to solve the same problem.

It is, therefore, a principal object of the present invention to provide an efficient and easy to use hot runner valve gate stem guide and seal.

It is a further object of the present invention to provide a device as aforesaid which minimizes or prevents leakage, which has been a significant problem heretofore.

Further objects and advantages of the present invention will appear hereinbelow.

SUMMARY OF THE INVENTION

In accordance with the present invention, the foregoing objects and advantages are readily obtained.

In accordance with the present invention, leakage is advantageously minimized or prevented by housing the valve stem in a guide sleeve that effectively seals against the valve stem. Thus, the present invention provides a hot runner valve gated system which directs melt from a melt channel to a melt cavity. The system comprises: at least one nozzle body adapted to be positioned in a mold plate; a mold cavity gate with a gate orifice therein adapted to be positioned adjacent a mold cavity; channel means extending through the nozzle body in communication with said melt channel for directing melt to said gate; a reciprocable valve stem positioned within the nozzle body; means for reciprocating said valve stem for opening and closing the gate orifice; a fixed guide sleeve positioned within the nozzle body and surrounding at least a portion of the valve stem to guide the valve stem, provide sliding engagement of the valve stem inside the guide sleeve and to provide a sealing means at the gate end of the nozzle body; at least one annular melt channel communicating with said channel means and surrounding said guide sleeve, including flow guiding means adjacent the valve stem to guide the melt flow to the annular melt channel; and means to align the guide sleeve with the nozzle body and to align the annular melt channel with the channel means. Desirably, the guide sleeve is surrounded by the melt stream for substantially the length thereof.

Further features of the present invention will appear hereinbelow.

BRIEF DESCRIPTION OF THE DRAWINGS

The present invention will be more readily understandable from a consideration of the accompanying, illustrative drawings, wherein.

BRIEF DESCRIPTION OF PREFERRED EMBODIMENTS

Figure 1:
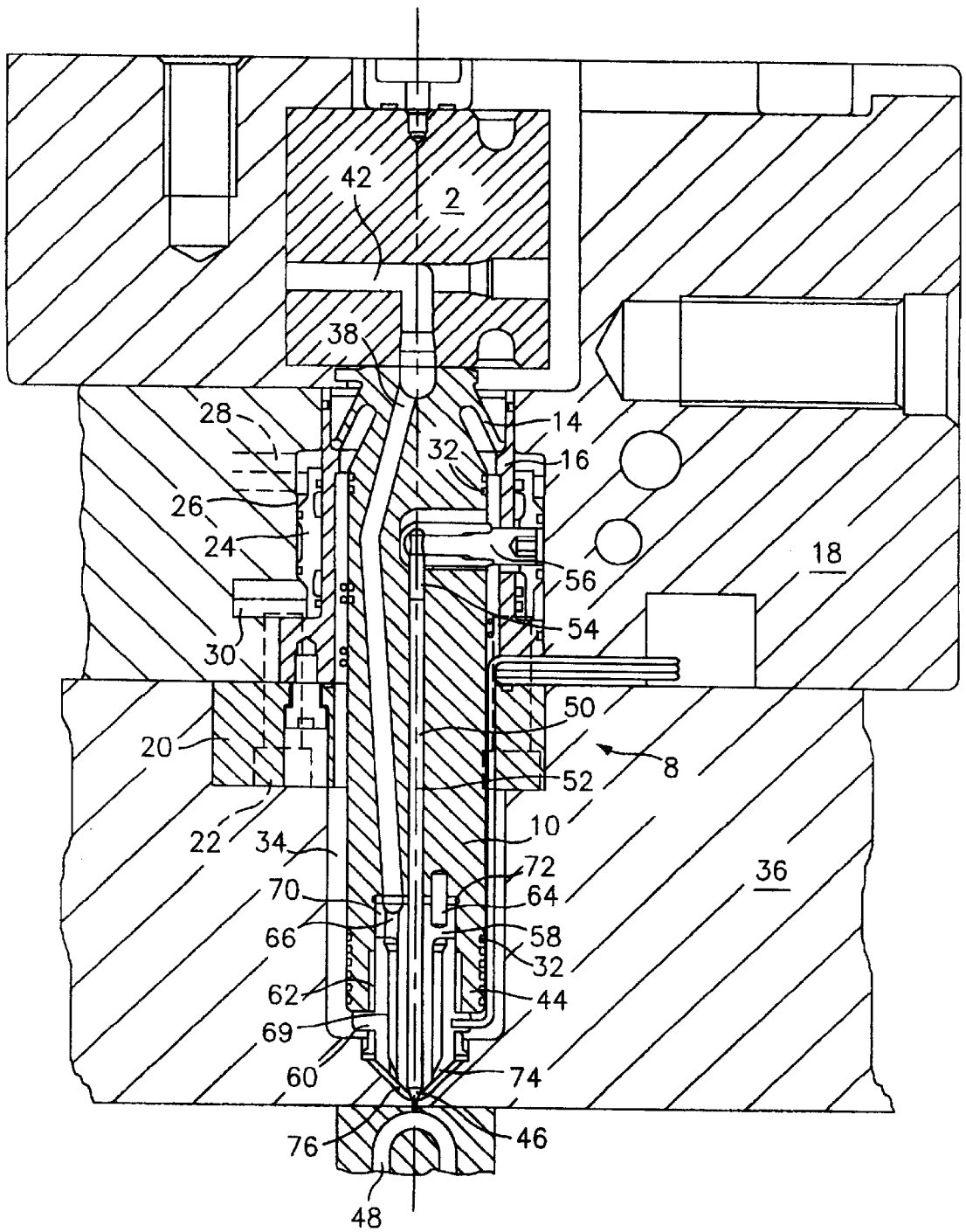
FIGS. 1 and 2 are cross-sectional views of the nozzle assembly of a first embodiment of the present invention.
Figure 2:
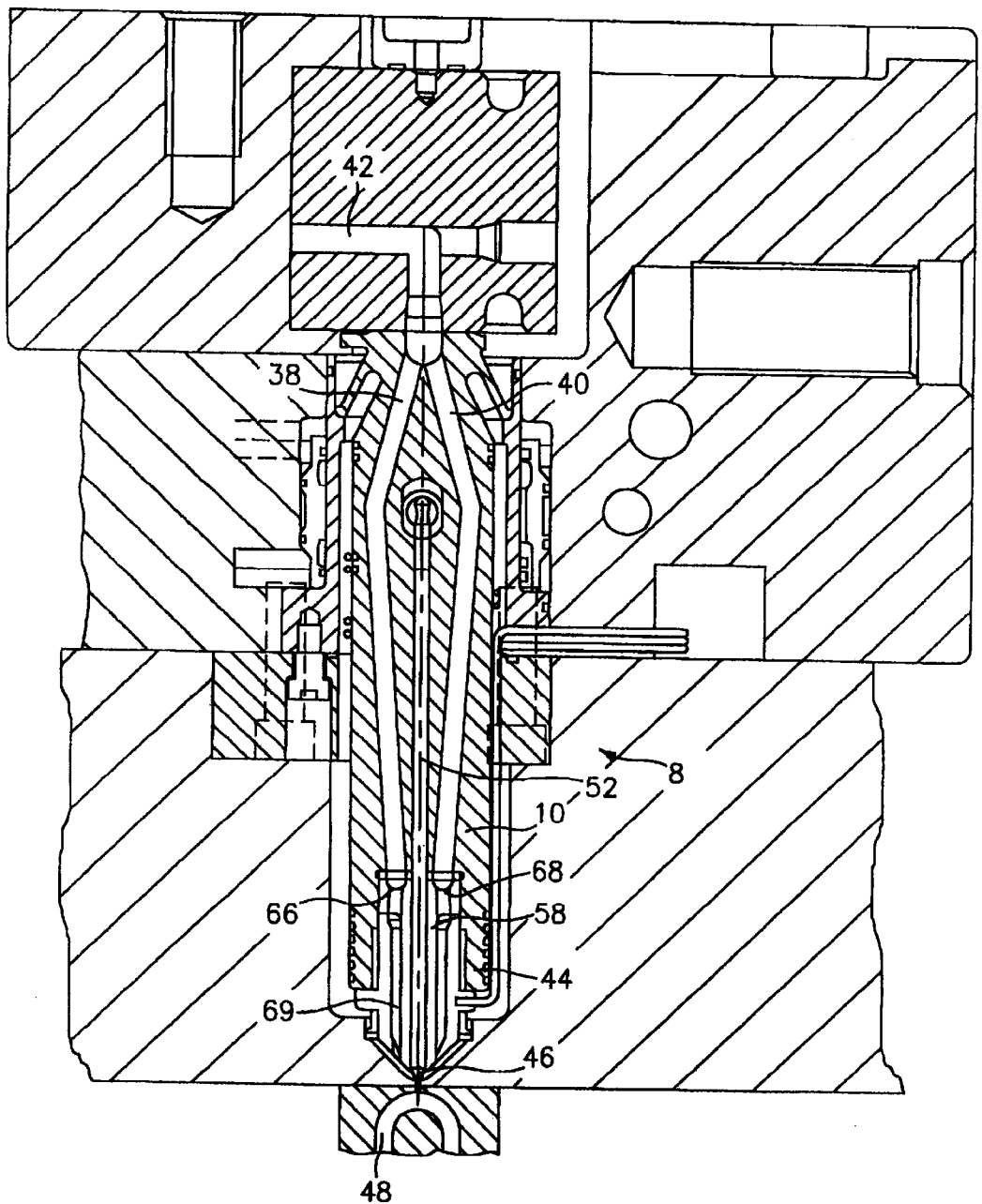

FIGS. 1 and 2 show an embodiment where the guide sleeve has a relatively thick wall structure. FIGS. 1 and 2 show a hot runner nozzle assembly 8 including nozzle body 10 held in sealing relationship to hot runner manifold 2 via a spring element 14 or the like that acts on outer housing 16 that is held in manifold plate 18 by front plate 20 and screws 22. Surrounding outer housing 16 is a cylindrical piston 24 that slides in bore 26 in the manifold plate 18. The cylindrical piston 24 can be moved forward or rearward by means of air pressure supplied through either channel 28 (forward) or channel 30 (rearward). The nozzle body 10 contains heater elements 32 particularly concentrated at each of its ends where loss of heat is greatest. Nozzle body 10 is also surrounded by a thermally insulating air gap 34 and is spaced from the cooled manifold plate 18 and cavity plate 36 to insure that transfer of heat is minimized. In addition, the nozzle body 10 contains channels, as melt channels 38, 40 (see FIG. 2), that connect the manifold melt channel 42 to the forward end 44 of the nozzle assembly 8 and ultimately to the mold cavity gate 46 and to the mold cavity 48.

Nozzle body 10 also contains a partial central bore 50 that houses valve stem 52, the rear end 54 of which is connected to piston 24 via pin 56 such that movement of piston 24 causes reciprocation of valve stem 52 to open or close mold cavity gate 46.

Guide sleeve 58 is positioned in the forward end 44 of the nozzle assembly 8 at the gate end of the nozzle body 10 to guide the valve stem 52 and also to provide a sealing means at the gate end of the valve stem. Guide sleeve 58 may be made of any high wear resistant tool steel and is typically a nickel/chrome tool steel with a gas nitriding surface treatment to harden the surface, or a steel alloy having hard wearing properties and is held in place by adjacent nozzle tip 60, which is typically made from titanium coated beryllium copper or other suitable material. The nozzle tip 60 is desirably threaded to nozzle body 10 at 62, with the nozzle tip trapping or holding the head 70 of guide sleeve 58 in place. Dowel 64 provides alignment between sleeve 58 and nozzle body 10 to insure that melt channels 66, 68 in guide sleeve 58 are aligned with corresponding melt channels 38, 40 in nozzle body 10 (see FIG. 2). Melt channels 66, 68 lead to annular melt channel 69 that surrounds guide sleeve 58. Optionally, compressed between guide sleeve 58, guide sleeve head 70 and nozzle body 10 is seal 72, typically made from beryllium copper, that under compression load seals the faces between the nozzle body and guide sleeve to prevent plastic leakage into valve stem bore 50.

At the gate end of the guide sleeve 58 flutes 74 extend inwardly from nozzle tip 60 to support the guide sleeve and help conduct heat to the gate area. Between the flutes 74 are passages 76 that connect the annular melt channel 69 surrounding guide sleeve 58 to mold cavity gate 46.

The present invention achieves significant advantages, as can be readily seen in the embodiment of FIGS. 1–2.

Thus, the gate area of the nozzle is a relatively cooler part of the melt channel and resin is more viscous in this area and less likely to leak back into the valve stem bore than it would if the stem sealing location was located further back into the body of the nozzle where melt temperatures are typically higher. Therefore, this represents an effective sealing area.

In addition, the valve stem slidingly engages the guide sleeve and the relatively longer, close tolerance sliding engagement of the valve stem inside the guide sleeve greatly inhibits leaking. This should be contrasted with prior art designs which generally provide space for only a short sealing engagement with the valve stem.

In addition to the foregoing, the body of the guide sleeve is desirably surrounded by the melt stream for substantially the length thereof and remains at a constant temperature. This helps to stabilize the temperature factors that affect the sealing effectiveness, since fluctuations in temperature of the sleeve would be conducted to the stem and alter the sliding fit tolerance, possibly causing seizing or leakage.

Still further, manufacture of the bore through the guide sleeve can be accurately performed in accordance with the present invention. Very accurate machining is required in order to provide a close tolerance sliding fit between the bore and the valve stem to prevent leakage.

Figure 3:
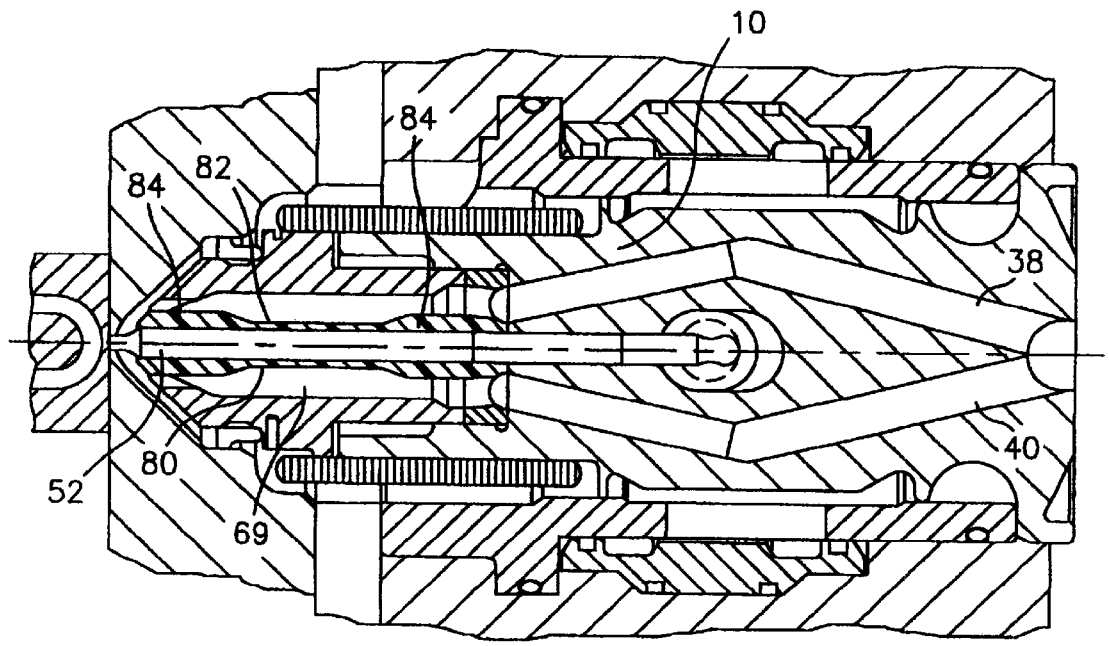
FIG. 3 is a cross-sectional view showing another embodiment of the nozzle assembly of the present invention.
Figure 4:
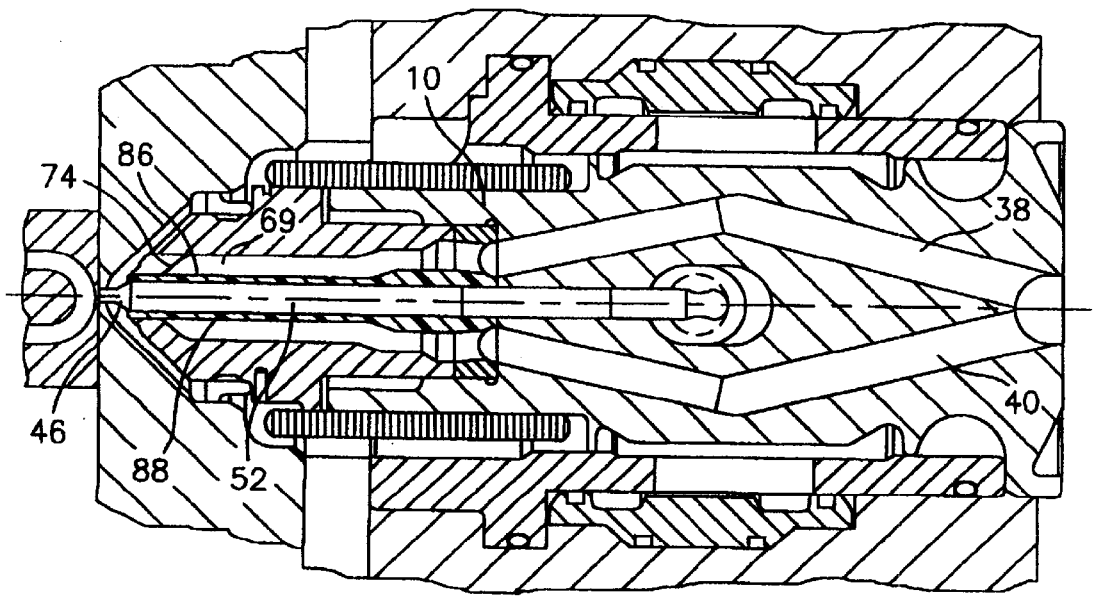
FIG. 4 is a cross-sectional view showing a still further embodiment of the nozzle assembly of the present invention.
Figure 5:
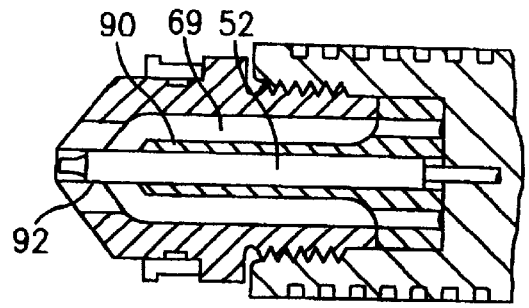
FIG. 5 is a partial cross-sectional view showing a still further embodiment of the nozzle assembly of the present invention.

FIGS. 3–5 show embodiments where the guide sleeve has a relatively thin wall structure.

In FIG. 3, the guide sleeve 80 is relatively thin and thinner than in FIGS. 1–2. Thus, guide sleeve 80 has a central portion 82 which is relatively thinner than end portions 84. For example, central portion 82 may typically be from 0.5 mm to 0.9 mm for at least a portion of its central length. This will allow the wall to deflect inwardly when subjected to high plastic pressure, typically injection pressures of for example 10,000 psi and higher. This deflection causes the central portion 82 of sleeve 80 to press against valve stem 52 and provide an absolute seal during this phase of the cycle. Note that the valve stem is stationary during injection and does not need to slide. This feature also means that accurate manufacturing of the bore in the sleeve is not required and a looser tolerance fit can be accommodated. This embodiment does not require a seal between the guide sleeve and nozzle body and thus it may be advantageous to apply approximately a 30% higher torque to the threaded tip in order to effect this seal. In some cases, this higher torque is acceptable and thereby reduces the cost of the assembly by eliminating the seal. However, in other cases the seal may prove to be necessary because if the tip is made of beryllium copper the high torque requirement may exceed its elastic limit when sustained at high nozzle temperatures.

This design is also advantageous, in addition to the advantageous features discussed heretofore. Thus, the thick wall version of FIGS. 1–2 may leak slightly at the stem/sleeve seal and cause problems when processing certain resins. With only a slight leak into the guide sleeve bore some resins will degrade, become sticky and may prevent the stem from moving. The thin wall design, however, prevents even a slight leakage from occurring because an absolute seal is achieved during the high pressure phase of the injection cycle.

FIGS. 4 and 5 show variations on the thin wall embodiment. FIG. 4 shows guide sleeve 86 wherein the thin walled section thereof 88 extends completely to the gate end of the sleeve. This allows the size of annular channel 69 adjacent flutes 74 to be larger and permits higher flow rates, or allows the nozzle tip wall thickness to be increased, thereby supporting higher pressure and conducting more heat to the gate.

FIG. 5 shows a shorter guide sleeve 90 that does not reach the flutes, thereby increasing the flow area further and permitting the flutes to extend closer to the gate to provide more heat in that area. In this embodiment, the flutes can be extended to guide the valve stem 52 at the forward portion 92 of the valve stem, or not as may be required.

Figure 6:
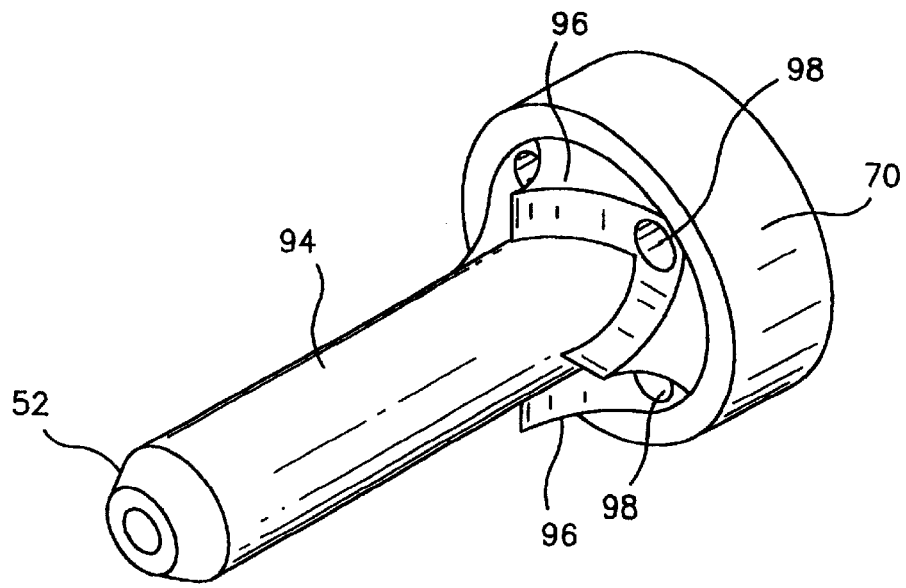
FIG. 6 is a perspective view showing flow guiding features of the guide sleeve of the present invention.
Figure 7:
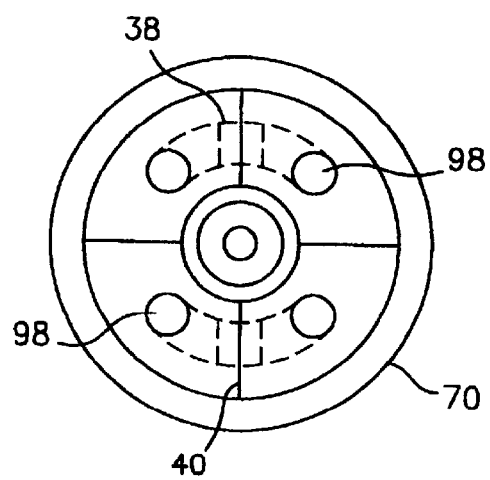
FIG. 7 is an end view of the guide sleeve head of FIG. 6.

FIG. 6 is a partial perspective view of flow guiding features of the guide sleeve and shows a perspective view of a guide sleeve 94 surrounding valve stem 52 with guide sleeve head 70, with FIG. 7 being an end view of guide sleeve head. Nozzle melt channels 38, 40 (shown in phantom in FIG. 7) engage connector channels 98 (four shown in FIG. 7), which in turn feed annular melt channel 69. In order to minimize dead areas downstream of the guide sleeve head where the connector channels 98 enter the annular melt channel surrounding the sleeve, contoured shapes 96 or the like guide elements are provided under the guide sleeve head to guide melt flow. These help the resin wash out the area as it flows through, thereby eliminating places where resin could be trapped and degrade. An advantage of this design is that the combining of separate melt channels, for example four separate melt channels, into one annular flow channel takes place within the same diameter as the annular channel itself, thereby saving space.

Figure 9:
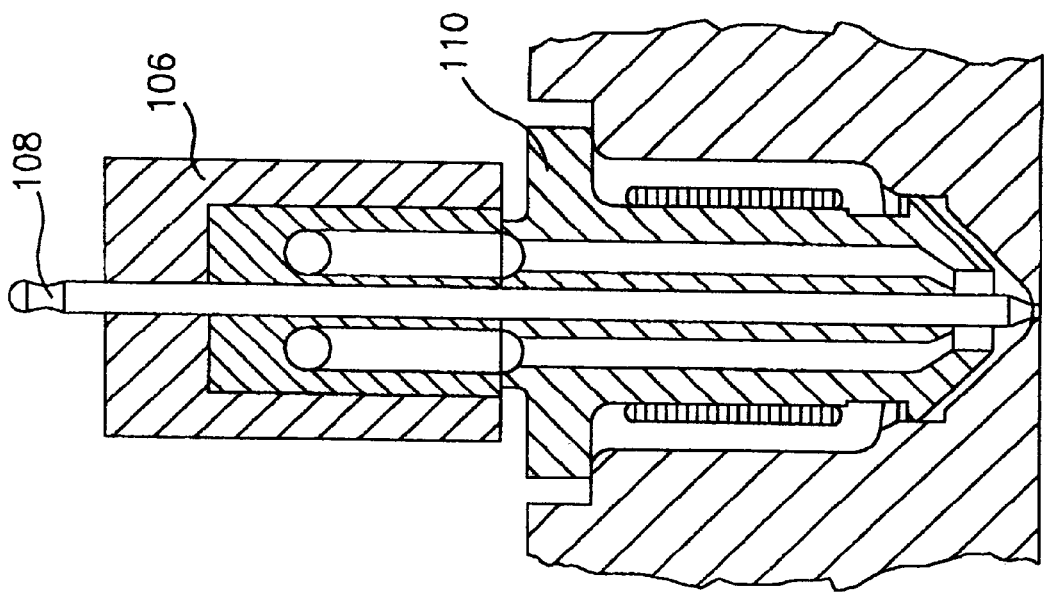
FIGS. 8–9 are cross-sectional views of further embodiments of the present invention.
Figure 8:
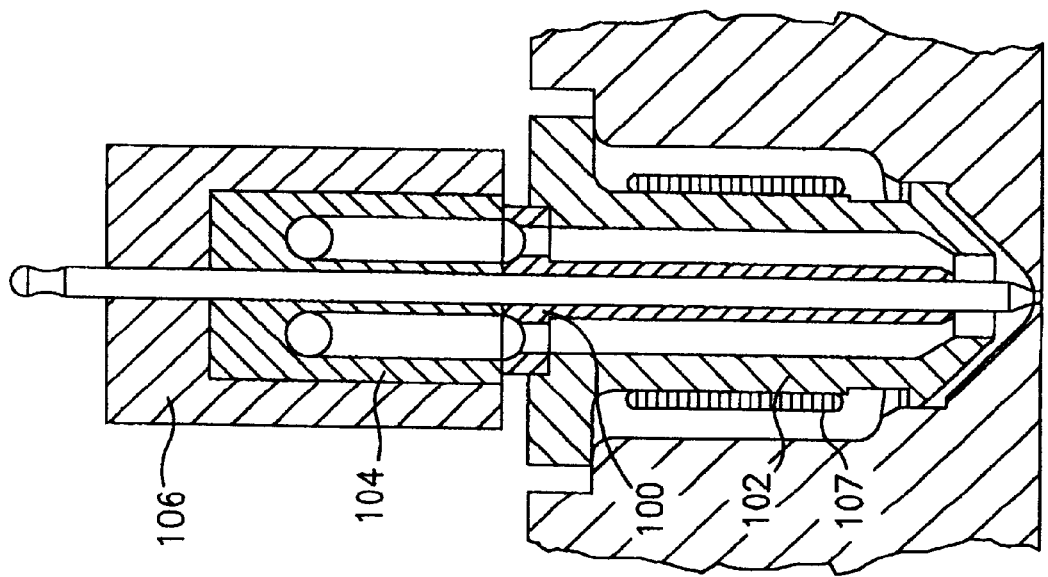

FIGS. 8–9 are cross-sectional views of an alternate embodiment of the present invention in which the guide sleeve seals directly against an insert in the hot runner manifold rather than inside the nozzle body. Thus, referring to FIG. 8, guide sleeve 100 as previously described hereinabove is held between nozzle body or housing 102 and manifold insert 104 which is located in manifold 106 and including heater 107. This also provides a channel splitting arrangement from the main manifold channel. FIG. 9 shows a "one piece" version of the FIG. 8 arrangement including valve stem 108, wherein guide sleeve and nozzle body or housing are combined into a single unit 110. The main advantage of the embodiments of FIGS. 8–9 is that the flow channel length and build height of the earlier embodiments is drastically shortened with corresponding reduction in mold height and the improved melt flow characteristics of a shorter length. Thus, the guide sleeve can seal against the nozzle body or a manifold insert, with or without a separate seal inserted therebetween. If a separate seal is not used, a higher torque is applied to the nozzle tip which must be strong enough to withstand the increased tightening forces. Therefore, the nozzle tip should desirably be a higher strength material than beryllium copper, as for example steel.

Thus, the present invention achieves significant advantages as discussed hereinabove. The present invention provides a hot runner valve stem sealing means which virtually eliminates leakage along the valve stem. In addition, flow guiding features are provided applied to combining melt streams around a valve gate which do not increase the size of the melt channel in which they are applied.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within its spirit and scope as defined by the claims.

What is claimed is:

1. A hot runner valve gated system which directs melt to a melt cavity, which comprises:

at least one nozzle body adapted to be positioned in a mold plate;

a mold cavity gate with a gate orifice therein adapted to be positioned adjacent a mold cavity;

channel means extending through the nozzle body for directing melt to said gate;

a reciprocable valve stem positioned within the nozzle body;

means for reciprocating said valve stem for opening and closing the gate orifice;

a fixed guide sleeve positioned within the nozzle body and surrounding at least a portion of the valve stem to guide the valve stem, provide sliding engagement of the valve stem inside the guide sleeve and to provide a sealing means at the gate end of the nozzle body; and at least one annular melt channel communicating with said channel means and surrounding said guide sleeve, including flow guiding means adjacent the valve stem to guide the melt flow to the annular melt channel, wherein the guide sleeve is operative to deflect against the valve stem when subjected to plastic pressure.

2. Apparatus according to claim 1, wherein the guide sleeve is positioned at the gate end of the nozzle body.

3. Apparatus according to claim 1, including means to align the guide sleeve with the nozzle body and to align the annular melt channel with the channel means.

4. Apparatus according to claim 1, wherein the guide sleeve is surrounded by the melt stream for substantially the length thereof.

5. Apparatus according to claim 1, including a thermal insulating air gap surrounding the nozzle body.

6. Apparatus according to claim 1, including at least two of said channel means extending through the nozzle body.

7. Apparatus according to claim 1, wherein said guide sleeve includes a guide sleeve head, and including a seal between the guide sleeve head and the nozzle body.

8. Apparatus according to claim 1, including means at the gate end of the guide sleeve to support the guide sleeve.

9. Apparatus according to claim 8, including a nozzle tip, wherein said means for supporting the guide sleeve includes flutes extending from the nozzle tip.

10. Apparatus according to claim 9, wherein the flutes are operative to guide the valve stem.

11. Apparatus according to claim 9, including channels between the flutes which connect the annular melt channel to the mold cavity gate.

12. Apparatus according to claim 11, wherein the guide sleeve has end portions and a central portion, and wherein said guide sleeve is relatively thinner in at least a portion of its central portion than the end portions.

13. Apparatus according to claim 11, wherein the guide sleeve is relatively thin extending to at least one end portion thereof.

14. Apparatus according to claim 1, wherein said channel means communicate with said annular melt channel adjacent the guide sleeve.

15. Apparatus according to claim 9, wherein the guide sleeve extends to the flutes.

16. Apparatus according to claim 9, wherein the guide sleeve extends to a point rearward of the flutes.

17. Apparatus according to claim 1, wherein said guide sleeve is operative to seal against the valve stem.

18. Apparatus according to claim 1, including a hot runner manifold adjacent said nozzle body.

19. Apparatus according to claim 18, wherein said guide sleeve seals against an insert in the hot runner manifold.

20. Apparatus according to claim 18, wherein said guide sleeve and nozzle housing are combined into one piece.

* * * * *